United States Patent [19]

Arai

[11] Patent Number: 4,560,620

[45] Date of Patent: Dec. 24, 1985

[54] SELF-CLEANING COATING COMPOSITIONS AND COOKING APPARATUS COATED THEREWITH

[75] Inventor: Nobushige Arai, Nara, Japan

[73] Assignee: Sharp Kabushiki Kaisha, Osaka, Japan

[21] Appl. No.: 683,644

[22] Filed: Dec. 19, 1984

Related U.S. Application Data

[60] Division of Ser. No. 433,525, Oct. 8, 1982, Pat. No. 4,504,717, which is a division of Ser. No. 229,522, Jan. 30, 1981, Pat. No. 4,374,754, which is a continuation-in-part of Ser. No. 057,106, Jul. 12, 1979, abandoned.

[30] Foreign Application Priority Data

Jul. 17, 1978 [JP] Japan .................................. 53-87424
Jul. 27, 1978 [JP] Japan .................................. 53-92388

[51] Int. Cl.⁴ ............................................... B22F 7/08
[52] U.S. Cl. ..................................... 428/565; 428/548; 428/447; 428/450; 219/10.55 E; 502/158
[58] Field of Search ............... 428/548, 565, 447, 450; 219/10.55 E; 502/158

[56] References Cited

U.S. PATENT DOCUMENTS

| | | | |
|---|---|---|---|
| 3,266,477 | 8/1966 | Stiles | 126/19 R |
| 3,308,079 | 3/1967 | Haenni | 523/101 |
| 3,460,523 | 8/1969 | Stiles et al. | 252/454 X |
| 3,607,372 | 9/1971 | Gilliom | 129/19 R X |
| 3,993,597 | 11/1976 | Stiles | 252/454 |
| 4,062,806 | 12/1977 | Roberts | 252/454 X |
| 4,112,179 | 9/1978 | Maccalous et al. | 428/450 X |
| 4,163,081 | 7/1979 | Schultz | 428/450 X |
| 4,169,185 | 9/1979 | Bhatia | 428/450 X |
| 4,180,482 | 12/1979 | Nishino et al. | 252/455 R |

*Primary Examiner*—Peter A. Nelson
*Attorney, Agent, or Firm*—Birch, Stewart, Kolasch & Birch

[57] ABSTRACT

A self-cleaning coating film is formed using a self-cleaning coating composition including an oxidation, catalyst mixed within a composition including silicone synthetic resin and an organic solvent. The oxidation catalyst includes at least one element selected from a metal such as a noble metal and a metal oxide such as manganese dioxide, copper oxide, iron oxide, nickel oxide, chrome oxide, and the like. The metal is blended with a powder made of alumina, or the like, in the range of about 0.1 to 1.0 weight %. The diameter of the particles of the powder is on the order of about 40 to 300μ. The powder is mixed with the composition in the range of about 5 to 100 weight %. The metal oxide is present in the composition at about 50 weight %. The self-cleaning coating film is formed at about 40 to 300μ thickness. The thus formed self-cleaning coating film is exposed to an elevated temperature of about 300° to 400° Centigrade for about 5 to 10 minutes, whereby the silicone synthetic resin is carbonized to form a film of SiO₂.

22 Claims, No Drawings

SELF-CLEANING COATING COMPOSITIONS AND COOKING APPARATUS COATED THEREWITH

CROSS REFERENCE TO RELATED APPLICATION

This application is a divisional of copending application Ser. No. 433,525, filed on Oct. 8, 1982, now U.S. Pat. No. 4,504,717, which is a divisional of application Ser. No. 229,522, filed on Jan. 30, 1981 (now U.S. Pat. No. 4,374,754), which is a continuation-in-part of application Ser. No. 57,106, filed on July 12, 1979 (now abandoned).

BACKGROUND OF THE INVENTION

1. Field of the Invention:

The present invention relates to self-cleaning coating compositions which are disposed on the inner surfaces of a cooking apparatus. More particularly, the present invention relates to self-cleaning coating compositions made of silicone synthetic resin and powder containing an oxidation catalyst.

2. Brief Description of the Prior Art

Conventional self-cleaning coating compositions are, for example, disclosed in Japanese Publication No. 47-17832, published May 24, 1972 and U.S. Pat. No. 3,460,523, issued Aug. 12, 1969.

The above-mentioned prior art references include organic materials, as binder or bonding agents for the self-cleaning coating compositions, and an aqueous solvent for dissolving the organic materials. In the Japanese Publication No. 47-17832, the binder is glassy frit materials. U.S. Pat. No. 3,460,523, discloses the use of silicates as the binder in the form of aqueous solutions.

In these prior art references, a disadvantage is that the surfaces on which the conventional self-cleaning coating compositions are formed must be completely and specially treated to prevent the self-cleaning coating compositions from being shed therefrom.

OBJECTS AND SUMMARY OF THE INVENTION

Accordingly, it is a primary object of the present invention to provide improved self-cleaning coating compositions.

It is another object of the present invention to provide improved self-cleaning coating compositions which may be easily formed on surfaces of any cooking apparatus.

It is a further object of the present invention to provide improved self-cleaning coating compositions which adhere to surfaces of any cooking apparatus, where a desired strength, hardness, abrasion resistance and toughness of the coating film are obtained.

It is another object of the present invention to provide an improved self-cleaning coating composition for application to a surface which includes an organic solvent whereby the solvent functions as a solvent for the silicone synthetic resin and whereby the solvent exerts a cleaning action on said substrate.

It is another object of the present invention to provide a coating composition which may be coated onto a variety of heat stable substrates such as metal plates, and interior oven surfaces.

The silicone synthetic resin self-cleaning coating composition contains at least three ingredients, i.e., a silicone synthetic resin, a heat stable oxidation catalyst and a solvent. The coating composition usually also includes carrier particles for the oxidation catalyst. However, the coating composition may also include various other additives such as bentonite or the like, and/or various other assistants such as powdered silica filler or the like.

Various types of silicone synthetic resins such as straight silicone synthetic resins, silicone synthetic resin intermediate products and modified silicone synthetic resins are useful in accordance with the teachings of the present invention. The silicone synthetic resins must be able to be formulated into a composition which can be easily coated onto a surface. The silicone synthetic resins must also be able to effectively bind oxidation catalyst particles and must be able to form a hard stable carbonized coating after exposure to carbonizing conditions.

The straight or unmodified silicone synthetic resins are silicone synthetic resins which are not polymerized, blended or mixed with any other non-silicone synthetic resin. This is a type of primary polymer. These resins may also be referred to as pure and non-blended silicone synthetic resins. These resins have various types of organic groups such as lower alkyl, preferably methyl, or aryl, preferably phenyl, groups each of which is connected to a silicone atom. Specific examples are methyl synthetic silicone resins where the organic group connected to each of silicone atoms is primarily methyl or methyl only and phenymethyl synthetic silicone resins where the organic groups connected to each of silicone resins are methyl or phenyl. The latter type of silicone synthetic resin may comprise recurring units of the following formula:

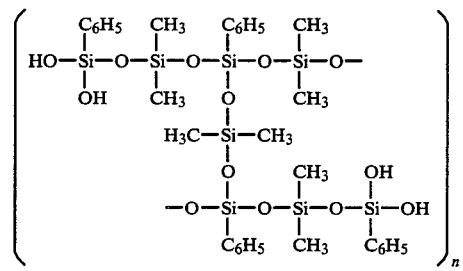

The silicone intermediate products may be identified as low molecular weight silicone synthetic resins having functional groups such as a lower alkoxyl group, such as methoxyl, or a hydroxyl group connected to the end of a molecule. These silicone intermediate products usually have a molecular weight between about 1,000 and about 1,500. The silicone intermediate products may be blended with non-silicone polymers such as polyesters, polyolefins, epoxy, alkyd, acryl, urethane, melanine, phenol, or the like. The silicone intermediate products may also be blended with other non-silicone intermediate products such as low molecular weight polymers, prepolymers and the like.

The modified silicone synthetic resins may be a straight silicone synthetic resin which is blended with another polymer such as a polyester, a polyolefin, an epoxy, an alkyd, ester, acryl, urethane, melanine, phenol, or the like.

These modified silicone synthetic resins may also be copolymers obtained by copolymerizing a silicone synthetic resin monomer or a silicone intermediate product with another monomer such as an epoxy, an alkyd, ester, acryl, urethane, melanine, phenol, or the like. The weight of the non-silicone component of the silicone synthetic resin should not exceed about 1.8 times the weight of the silicone component of the resin. Modified silicone synthetic resins which contain at least 50%, preferably between about 50 and 90%, of the silicone synthetic resin component are preferred.

One example of a modified silicone synthetic resin is a silicone resin copolymerized with epoxy which can be represented as follows:

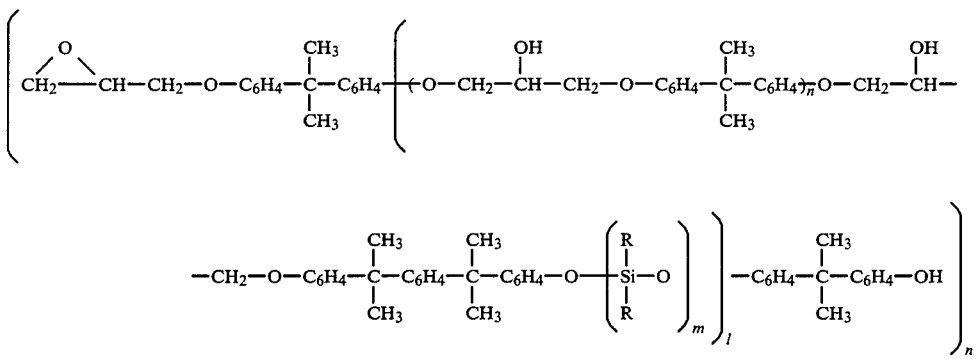

wherein m is an integer between about 2 and 80 and l is between about 10 and 20, and n is between about 0 and 12.

Blending methods such as the cold blending method which is normally used for preparing only the blend of the straight synthetic resin and the other synthetic resin or the heat blending method which is normally used for effecting a copolymerization reaction between the straight synthetic resin or silicone intermediate product and other synthetic resin may be used. Any one of the above resins or mixtures thereof may be used as a solution in a suitable organic solvent when applied as a self-cleaning coating material of the present invention. Many types of silicone resins are examined to determine whether they can be used as a binder material for bonding oxidation catalyst particles to each other. As a result, it is found that most of them can satisfy this requirement.

When the resin blended or copolymerized with the straight silicone resin does not have in its main chain a group such as "—TiO—", "—AlO—" or "—SiO$_2$—" like silicone resin copolymerized with epoxy or silicone resin copolymerized with alkyds, it is preferable that the weight of the resin blended should not exceed about 1.8 times the weight of straight-silicone resin.

Various types of organic solvents are useful in accordance with the teachings of the present invention. The solvents are preferably non-aqueous solutions. Useful solvents include alcohols such as methanol, ethanol, iso-propanol butanol, diacetone alcohol, ethers such as diethyl ether, dioxane, and butyl cellosolve, aromatic solvents such as benzene, toluene, xylene, ketones such as acetone methyl ethyl ketone (MEK), chloroform, carbontetrachloride, or the like.

The preferred solvents are toluene, xylene, diacetone alcohol, butyl cellosolve or the like. While the above solvents have been given as examples of solvents which might be useful, any solvents which can effectively disperse the various components of the silicone synthetic resin composition to form a coatable composition may be used. The silicone synthetic resin composition contains between about 50 and 70 weight % of the organic solvent.

The oxidation catalyst is any heat stable oxidation catalyst which can effectively oxidize fats, oils, grease and other materials which fall onto the self-cleaning coating film during cooking. The oxidation catalyst may be any compound which meets the above requirements such as a metal or a metal oxide or mixtures thereof. Noble metals such as palladium and platinum are preferred. Examples of useful metals are cobalt, manganese, iron, copper, nickel, or the like, with a surface area in excess of 0.1 square meter per gram. Oxides of the above metals are also useful. Examples of useful metal oxides are manganese dioxide, copper oxide, iron oxide, nickel oxide, chrome oxide, titanium oxide, cobalt oxide, or the like.

The metals and metal oxides are preferably in the form of particles having an average particle diameter between about 10 to 200$\mu$, preferably between about 50 and 70$\mu$. The oxidation catalyst is present in the silicone synthetic resin composition in an amount between about 0.1 and 50 weight %, preferably between about 0.1 and 30 weight %.

The coating composition will also usually include carrier particles for the oxidation catalyst particles. These carrier particles are preferably made of a heat stable powdery material such as alumina(Al$_2$O$_3$), cordierite(2MgO.2Al$_2$O$_3$.5SiO$_2$), mullite (3Al$_2$O$_3$.2SiO$_2$) etc. The diameter of these carrier particles is on the order of about 40–300$\mu$, preferably 40–200$\mu$. The powder is utilized for expanding the surface area over which the oxidation catalyst particles are dispersed. The carrier particles should be present in the silicone synthetic resin coating composition in an amount up to about 70% by weight, preferably between about 30 and 70 weight %, most preferably between about 50 and 60 weight %.

To achieve the above objects, pursuant to an embodiment of the present invention, a self-cleaning coating film is formed using a self-cleaning coating composition including a heat-stable oxidation catalyst mixed within a composition including silicone synthetic resin and an organic solvent. The oxidation catalyst includes at least one member selected from a metal such as a noble metal, a metal oxide such as manganese dioxide, copper oxide, iron oxide, nickel oxide, chrome oxide, and the like. The metal or metal oxide is blended with powder made of alumina etc. in the range of about 0.1 to 1.0 weight % to form a mixed powder. The diameter of the particles in the powder is in the order of about 40–300$\mu$.

The mixed powder is mingled within the composition in the range of about 5 to 95 weight %, preferably between about 50 and 95 weight %.

The metal oxide is combined into the composition in about 50 weight %. The self-cleaning coating film is formed about 40 to 300μ in thickness.

The thus formed self-cleaning coating film is exposed to an elevated temperature of about 300° to 400° Centigrade for about 5 to 10 minutes, whereby the silicone synthetic resin is carbonized to form a film of $SiO_2$.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Conventional painting materials in which an appropriate oxidation catalyst of the present invention is mixed will be described first. These painting materials have thermostable components which are thermostable up to 600° Centigrade. These paintaing materials are in the form of organic solutions as summarized in Table 1 below.

TABLE 1

| | | Weight % | |
|---|---|---|---|
| Components | | Sample 1 | Sample 2 |
| Binder or Bonding Material | Silicone Synthetic Resin | 40 | 38.1 |
| Pigment | Black Pigment | 25*[1] | 24.5*[2] +10.3*[3] |
| Additive | Assistant*[4] | 25 | 18.7 |
| Solvent | Organic*[5] Solvent | 10 | 8.4*[6] |

*[1] A composition of powder made of at least one metal material selected from Co, Mn, Fe, Cu, Ni and the like and powder made of metal oxide materials
*[2] A black powder made of metal oxide
*[3] Mica
*[4] Compositions of a kind of silicate in the form of organic solvents
*[5] Agents selected from ketones, xylole, toluene alcohol and the like
*[6] Agents made of xylone and the like The various components of the composition, except for the organic solvent, have heat-stable properties.

The following examinations were carried out to select useful oxidation catalysts added to the painting materials of Table 1.

Preliminary Examinations

Mixed oil of 60 weight % and one of the following oxidation catalysts at 40 weight % were kneaded together. The mixed oil includes 10% butter, 20% corn oil, 10% fish oil, 20% beef oil, 20% horsebean oil, 20% soybean oil, all units being weight %. The tested oxidation catalysts were preliminarily heated at about 500° centigrade for about an hour.

Compositions made of the mixed oil and the tested oxidation catalysts were coated on a heat-stable glass substrate at a thickness of about 30 μm, which were heated at about 250° centigrade for about one hour.

Standard of Judgement

After the heating at about 250° centigrade for about one hour, the evaporation ratio of the mixed oil was determined. The evaporation ratio is represented by the equation:

$$\text{evaporation ratio (\%)} = \frac{\text{decreased weight of the composition}}{\text{total weight of the mixed oil to be used}} \times 100$$

It can be considered that the data of the evaporation ratio over 100% are derived from the facts that oxygen and the like included within the oxidation catalysts was evaporated. The data having a considerably small evaporation ratio can be thought due to a small degree of evaporated mixed oil.

Results of Preliminary Examination

The following evaporation ratios were obtained for the respective oxidation catalysts to determine whether they are appropriate for the present invention.

TABLE 2

| Tested Oxidation Catalysts | Evaporation Ratio (%) |
|---|---|
| Ziroconium | 33.2 |
| Titanium oxide | 23.8 |
| vanadium | 21.3 |
| chromium | 12.4 |
| manganese dioxide | 126.5 |
| nickel oxide | 123.7 |
| iron oxide | 30.3 |
| cobalt oxide | 10.8 |
| tungsten oxide | 18.4 |
| molybdenum oxide | 12.3 |
| copper oxide | 14.8 |
| zinc oxide | 12.6 |
| 0.5% palladium | 81.4 |
| 0.2% platinum | 86.9 |

According to the results of the preliminary examination, the oxidation catalysts of the present invention should be selected from a noble metal material such as palladium, platinum and the like, and an oxided metal material such as manganese oxide, nickel oxide and the like. The noble metals can be utilized in a simple body or in a mixed form with each other and/or with the metal oxide material. The metal oxide materials can also be used in a mixed form with each other.

The following examples are presented in detail to show the products, processes and uses of the present invention.

EXAMPLE 1

The painting materials as shown in Table 1 are utilized for this example. The painting materials to be applied include solid bodies of about 50 to 80 weight % which is represented by an amount of the residue after heating at about 250° centigrade for about 3 hours. The silicone synthetic resin and the organic solvent can be dissipated by evaporation.

Within the painting materials, there is uniformly mixed a volume of powder comprising carrier particles of about 40 to 300μ diameter. The powder permeates or holds by coating a material of platinum in about 0.1 to 1.0 weight %.

It is preferable that the powder containing the oxidation catalyst be mingled with the painting material at 1:2 in the ratio of weight. Other ratios such as 1:1, 1:3 and 1:4 of the powder within the painting materials are also acceptable. Besides Pt, a metal material such as palladium, ferrite and like is acceptable for the oxidation catalyst.

Self-cleaning coating compositions of the present invention are obtained as desired above. Coating processes for the present self-cleaning coating compositions are specified as follows:

A substrate to be coated with the present self-cleaning coating compositions is initially prepared. The substrate is preferably a plate made of cold rolled steel plate (SPCC steel plate), a steel plate gilded by aluminum or zinc metal, a stainless steel plate, iron casting and the like. The substrate is defatted with a suitable organic solvent or by means of emulsion methods with the aid of weak alkaline or neutral reagents. The substrate is washed and then dried after the oil extraction or defatting.

Thereafter, the present self-cleaning coating compositions which are adjusted with a suitable organic solvent such as ketone, xylole, toluene, alcohol, and the like are coated on the substrate. A coated film from about 40 to 300$\mu$ thickness, preferably about 150 to 250$\mu$ thickness, is obtained by a procedure wherein the spraying method, the drying process and the baking process are each carried out only once.

Another coated film from about 100 to 200$\mu$ thickness is derived by a procedure wherein a sequence of the spray method and then the drying process is repeated twice, and thereafter the baking process is performed.

It is required that the oxidation catalyst particles be exposed or appear from the painting material, especially, the silicone synthetic resin in an amount enough to be effective.

To this end, the silicone synthetic resin is baked for carbonization purposes by disposing the coated film within a furnace heated at about 300° to 400° centigrade for about 5 to 10 minutes whereby the silicone synthetic resin is converted into a $SiO_2$ film. The coated film thus obtained is porous, has a good reliability in obtaining desired strength, hardness, adhesion and is tough enough to provide good catalytic activity. There is no problem, even with insufficient defatting because of the utilization of the organic solvent.

The results in Table 3 below were obtained by a test wherein salad oil was sprinkled over a film made of the present self-cleaning coating compositions which was coated on surfaces of a cooking apparatus, for example, a gas oven. The sprinkled salad oil was dried and fixed at about 150° to 200° centigrade. Self-cleaning properties were examined in such a manner and the gas oven was intermittently operated to provide heat of a temperature of about 300° to 400° centigrade for about 20 hours.

An example of a coated film made of the present self-cleaning coating compositions formed on the surfaces of a gas oven is as follows, a steel plate gilded by aluminum layers is utilized for oven surfaces of a gas oven. On the aluminum layer, there is formed a coated film made of the present self-cleaning coating compositions preferably in the range from about 40 to 300$\mu$ thickness.

TABLE 3

| Experiment | Self-Cleaning Coating Compositions | Evaluation |
|---|---|---|
| 1 | Powder made of alumina comprising particles of 74 to 297$\mu$ diameter containing 0.2% Pt [Mixed Ratio] Painting Materials including the solid bodies of about 50 to 60 weight %: | ~O |

TABLE 3-continued

| Experiment | Self-Cleaning Coating Compositions | Evaluation |
|---|---|---|
|  | Powder = 2:1 (The mixed ratio is common to all the experiment except for Experiment 4) |  |
| 2 | Powder made of alumina comprising particles of 44$\mu$ to 74$\mu$ diameter containing 0.2% Pt | ~O |
| 3 | Powder made of alumina comprising particles of 40$\mu$ diameter containing 0.5% Pt |  |
| 4 | Only the painting materials listed in Examples 1 and 2 of Table 1 | X |
| 5 | Powder made of ferrite comprising particles of 74 to 297$\mu$ diameter containing metal oxide | Δ~O |
| 6 | Powder made of ferrite comprising particles of 44 to 74$\mu$ diameter containing metal oxide | Δ~O |

⊚: very superior
O: considerable efficiency
Δ: a little efficiency
X: no efficiency

EXAMPLE 2

The painting material of Table 1 for containing the oxidation catalyst powder of the present invention is replaced by that of Table 4. The kind of the compositions of Table 4 is not changed, only the ratio of the compositions utilized is modified.

TABLE 4

|  | Compositions | Weight % |
|---|---|---|
| Binder | Silicone Synthetic Resin | 40 |
| Pigment | Black Pigment (common to that of sample 1 of Table 1) | 25 |
|  | Mica | 10 |
| Addition | Assistant | 15 |
| Solvent | Organic Solvent | 10 |

The painting materials shown in Table 4 include a ratio of the solid bodies of about 60 to 80 weight %. Within the painting materials of this type, there is uniformly combined a certain amount of the powder comprising the particles in the range of about (60±20)$\mu$ diameter. The powder is made of the same aluminum compound as in Example 1. The powder contains, or carries by means of a coating, a platinum material in the ratio of about 0.1 to 0.5 weight %. An example of the present self-cleaning coating materials in this example is thus obtained.

The coating process for the self-cleaning coating materials of this type is repeated in the same manner as Example 1. The coated film by the self-cleaning coating materials of this type is formed in the range of about 40 to 120$\mu$ thickness through the use of the process wherein each of the spray method, the drying process, and the baking process therefor are performed only once. It is preferable that the coated film be mounted on the surface of a substrate in the range of about 40 to 300$\mu$ thickness.

The following samples are obtained using a powder made of alumina, the particles of which being about 40$\mu$ diameter. The powder contains 0.5% Pt or 0.2% Pt in the range of about 0.1 to 0.5 weight %. The painting materials used contain a ratio of the solid bodies of about 60 weight %. The powder is blended into the painting materials in the range of about 2, 5, 8, 12, 15 and 20 weight %, respectively.

TABLE 5

| Contents (weight %) | Alumina Powder containing 0.2% Pt | Alumina Powder containing 0.55% Pt |
|---|---|---|
| 2 | Δ-x | Δ |
| 5 | Δ-O | O |
| 8 | O | |
| 12 | | |
| 15 | | |
| 20 | Δ-O | Δ-O |
| nil | x | x |

⦿ : very superior
O: enough efficiency
Δ: a little efficiency
x: no efficiency

The results listed in Table 5 were obtained by an examination wherein an amount of salad oil, for example, 3 cc was sprinkled over a surface of the gas oven on which the present self-cleaning coating film was formed. The gas oven was operated to provide heat of about 250° to 300° centigrade for about 8 hours, which is a usual temperature for gas ovens. The above stated data was obtained after the operation of the gas oven in a such a manner.

As apparently noted from Table 5, the powder containing Pt as the oxidation catalyst should be mixed with the painting material in the range of about 5 to 20 weight %. This kind of the powder contributes to the enhancement of the self-cleaning characteristics and the persistence of the coating film.

Another kind of the powder having Pt below 5 weight % is not contributive to enhancing the self-cleaning characteristics although there is the persistence.

In addition to Pt, a noble metal material such as palladium (Pd) is preferable for the oxidation catalyst of the present invention, the powder such as alumina containing the noble metal material being contained within the painting material in the order of about 5 to 20 weight %.

EXAMPLE 3

In this instance, the painting materials are utilized in the same compositions as in Table 1 and Table 4. Various oxidation catalysts are blended within the painting materials as summarized in Table 6. The evaporation ratio (%) defined above is determined by sprinkling a volume of the salad oil, say, about 5 cc over the self-cleaning coating film of the present invention. The self-cleaning coating film mounting the volume of the salad oil is heated at about 250° centigrade for about 1 hour.

TABLE 6

| Mixing ratio of a material containing oxidation catalyst to painting material (weight %) | The material | Evaporation Ratio (%) | Evaluation |
|---|---|---|---|
| Painting material: the material (common in hereinafter) = 2:1 | Alumina powder containing 0.2% Pt | 42 | |
| 3:1 | The same | 36 | o |
| 2:1 | Alumina powder containing 0.5% Pt | 44 | |
| 2:1 | Alumina powder containing 0.5% Pd | 32 | o |
| 2:1 | manganese dioxide | 38 | o |
| 2:1 | nickel oxide | 33 | o |
| 2:1 | copper oxide | 18 | x |
| 2:1 | iron oxide | 24 | Δ |
| 2:1 | manganese dioxide and nickel oxide (the same amount in weight as common hereinafter) | 44 | |
| 2:1 | manganese dioxide and copper oxide | 33 | o |
| 2:1 | manganese dioxide and iron oxide | 36 | o |
| 2:1 | copper oxide and iron oxide | 18 | x |

⦿ : very superior (evaporation ratio above 40%)
o: enough efficiency (evaporation ratio between 30 and 40%)
Δ: a little efficiency (evaporation ratio between 20 and 30%)
x: no efficiency (evaporation ratio below 20%)

The particles of the alumina powder used have the same diameter as described above. The self-cleaning coating films are formed in about 200μ thickness.

As noted from Table 6, a certain metal oxide such as manganese dioxide, nickel oxide, and the like is appropriate as the oxidation catalyst and there is no need to mix a powder such as alumina with the same. Chrome oxide is also available. Compositions combined with at least two kinds of the metal oxide are also useful in the present invention.

The present self-cleaning coating compositions are specified in Example 1 to 3 can be applied to any cooking apparatus such as an electric oven, a gas oven, a microwave oven, especially, for providing elevated temperatures, a combined cooking apparatus including at least two kinds of heating sources, and the like. As an example, a combined microwave oven and electric oven, the surfaces of which carry the self-cleaning coating film of the present invention, may be utilized.

The combined cooking apparatus comprises a housing containing a magnetron, interior surfaces, an upper heater and a lower heater.

There may be further provided a wave guide, a cover for the wave guide, a bottom wall, a plate for carrying a foodstuff, and an oven door.

The silicone synthetic resin to be used for the present invention includes at least one member selected from straight silicone resins, silicone resins copolymerized with alkyds, silicone resins copolymerized with epoxy, and silicone resins copolymerized with acrylics, or the like according to the teaching of this application.

The preparation and properties of various coating materials are described below:

1. COATING MATERIAL

| Components | Example | Weight % |
|---|---|---|
| binder | silicone synthetic resin copolymerized with epoxy* | 15 |
| catalyst | $MnO_2$ | 30 |
| assistant | powered silica | 30 |
| additive | Bentonite | 10 |
| organic solvent | Butyl cellosolve Xylene Diacetone alcohol | 15 |

*Any of ES-1001 and ES-1004 (Shin-Etsu Chemical Co., Ltd.) and TSR-194 (Toshiba Silicone, Ltd.)

While the ratio of the examples mixed is maintained, each of the examples of binder and other agents can be replaced by any suitable material according to the teachings of the present invention. The following data are obtained under such a modification.

The respective coating materials are prepared by such a replacement. Each of them is coated on a suitable plate, preferably, a steel plate gilded with an aluminum film of about 200 to about 250 μm in thickness. Pre-baking of this film is carried out at about 80° centigrade for about 15 minutes. Further, the film is baked at about 400° centigrade for about 15 minutes.

2. Examination Method 2-1. Hardness Examination: The peripheral edge of a copper coin is stressed under a load of about 1 kg for a travel of about 0.5 m directly on the surface of the above described film.

Judgement
　　no scratch
O scratch less than about 5% of the travel
Δ scratch less than about 30% of the travel
x scratch more than about 30% of the travel 2-2. Adherence Examination: On the surface of the coated film 36 squares having a side of about 5 mm are formed in a checker format by a cutter. The depth of respective grooves formed reach the surface of the steel plate from the surface of the coated film. Broken pieces of the film at the groove crossing points are measured with the eye.

Judgement
　　no pieces
O a small diameter and a small amount of broken pieces
Δ a small diameter and a large amount of broken pieces
x a large diameter and a large amount of broken pieces 2-3. Examination of Alkali Resistivity: a 3% NaOH solution is heated up to about 40° centigrade and the plate coated with the resin is soaked for about 3 hours. Thereafter, the sample is removed from this solution and the properties thereof judged.

Judgement
　　no change
0 a slight discoloration
Δ a small chalking on the surface of the film
x removal of the film on the substrate 3. Result of Examination 3-1. Straight synthetic silicone resin
H: hardness examination
Ad: adherence examination
A: examination of alkali resistivity

| Kind of resin | Example of resin (commercial name) | manufacturer of resin | H | Ad | A | Silicone resin | Organic resin |
|---|---|---|---|---|---|---|---|
| methyl silicone | KR-220 | Shin-Etsu Chemical Co., Ltd. | | O | Δ | | |
| methyl silicone | XR-3370 | Toshiba Silicone Co., Ltd. | | O | Δ | | |
| methyl silicone | RHODORSIL RESIN 10336 | Dainippon Ink & Chemicals, Inc. | | O | Δ | | |
| phenylmethyl silicone | SH-804 | Toray silicone Company, Ltd. | | O | O | | |
| phenylmethyl silicone | TSR-117 | Toshiba Silicone Co., Ltd. | O | | | | |
| phenylmethyl silicone | TSR-145 | Toshiba Silicone Co., Ltd. | | O | O | | |
| phenylmethyl silicone | KR-282 | Shin-Etsu Chemical Co., Ltd. | O | | | | |
| phenylmethyl silicone | RHODORSIL RESIN 6405 | Dainippon Ink & Chemicals Inc. | O | O | O | | |
| phenylmethyl silicone | BAYSILONE RESIN P-150K | Bayer Aktiengesellschaft | O | O | O | | |
| (3-2) Silicone Intermediate Product | | | | | | | |
| | TSR-160 | Toshiba Silicone Co., Ltd. | O | O | O | | |
| | DR-216 | Shin-Etsu Chemical Co., Ltd. | O | O | O | | |
| (3-3) Modified Silicone Synthetic Resin | | | | | | | |
| silicone resin copolymerized with alkyds | TSR-180 | Toshiba Silicone Co., Ltd. | Δ | | Δ | weight ratio 1 | weight ratio 1 |
| silicone resin copolymerized with alkyds | SA-4 | Shin-Etsu Chemical Co., Ltd. | Δ | | Δ | 1 | 1 |
| silicone resin copolymerized with polyester | TSR-187 | Toshiba Silicone Co., Ltd. | Δ | O | Δ | 1 | 1 |
| silicone resin copolymerized with polyester | AY-42-001 | Toray Silicone Company, Ltd. | Δ | O | Δ | 1 | 1 |
| silicone resin copolymerized with polyester | UD-125 | Bayer Aktiengesellschaft | Δ | O | Δ | 1 | 1 |

-continued

| Kind of resin | Example of resin (commercial name) | manufacturer of resin | | H | Ad | A | Silicone resin | Organic resin |
|---|---|---|---|---|---|---|---|---|
| silicone resin copolymerized with acryl | KR-3093 | Shin-Etsu Chemical Co., Ltd. | | Δ | O | Δ | 1 | 1 |
| silicone resin copolymerized with acryl | TSR-170 | Toshiba Silicone Co., Ltd. | | Δ | O | Δ | 1 | 1 |
| silicone resin copolymerized with acryl | SE-653 | Mitsubishi Rayon Co., Ltd. | | Δ | O | Δ | weight ratio 1 | weight ratio 1 |
| silicone resin copolymerized with urethane | TSR-175 | Toshiba Silicone, Ltd. | | Δ | O | Δ | 1 | 1 |
| silicone resin copolymerized with epoxy | ES-1001 | Shin-Etsu Chemical Co., Ltd. | | O | O | O | 4 | 6 |
| silicone resin copolymerized with epoxy | ES-1004 | Shin-Etsu Chemical Co., Ltd. | | O | O | O | 4 | 6 |
| silicone resin copolymerized with epoxy | TSR-194 | Toshiba Silicone, Ltd. | | O | O | O | 4 | 6 |
| silicone resin copolymerized with melanine | TSR-145 | Toshiba Silicone, Ltd. | 80 w% | O | O | Δ | 8 | 2 |
| | L-109-65 | Dainippon Ink & Chemicals Inc. | 20 w% | | | | | |
| silicone resin copolymerized with melanine | TSR-160 | Toshiba Silicone Co., Ltd. | 70 w% | O | O | Δ | 7 | 3 |
| | YUBAN 220 | Mitsui Toatsu Chemicals, Inc. | 30 w% | | | | | |
| silicone resin copolymerized with phenol | TSR-145 | Toshiba Silicone Co., Ltd. | 60 w% | O | | O | 6 | 4 |
| | CKM-908 | Showa Union Co., Ltd. | 40 w% | | | | | |
| silicone resin copolymerized with phenol | TSR-145 | Toshiba Silicone Co. Ltd. | 40 w% | O | | O | weight ratio 4 | weight ratio 6 |
| | phenol resin | Dainichiseika Color & Chemicals Mfg. Co., Ltd. | 60 w% | | | | | |

A temperature at which resin material carbonizes by baking is within about 320° to about 500° C., more preferably within about 370° to about 420° C. In connection with heat stability, a temperature at which the coated resin film is resistant is below several tens degree centigrade, more preferably, about 30° C. than the temperature for the carbonization baking. The assistant functions only to enlarge the total mass of the resin material. Any suitable material of the assistant except powered silica may be selected.

While only certain embodiments of the present invention have been described, it will be apparent to those skilled in the art that various changes and modifications may be made therein without departing from the spirit and scope of the invention as claimed.

What is claimed is:

1. A heat-stable coated substrate which catalytically oxidizes and removes fats and oils deposited thereon comprising:
   (a) a heat-stable substrate and
   (b) a carbonized coating disposed on at least one surface of said substrate said coating being formed from a coating composition of at least one silicone synthetic resin binder selected from the group consisting of straight silicone resins, silicone resins copolymerized with alkyds, silicone resins copolymerized with epoxy, and silicone resins copolymerized with acrylics; an organic solvent; and a thermostable oxidation catalyst mixed within said silicone synthetic resin and said organic solvent.

2. A heat-stable coated substrate which catalytically oxidizes and removes fats and oils deposited thereon, comprising:
   (a) a heat-stable substrate and
   (b) a coating of SiO₂ formed on at least one surface of said substrate, said SiO₂ coating being a carbonized coating of at least one silicone synthetic resin binder selected from the group consisting of straight silicone resins, silicone resins copolymerized with alkyds, silicon resins copolymerized with epoxy, and silicone resins copolymerized with acrylics; an organic solvent; and a thermostable oxidation catalyst mixed within said silicone synthetic resin and said organic solvent.

3. The heat-stable coated substrate according to claim 2, wherein said oxidation catalyst includes at least one material selected from a metal material and a metal oxide.

4. The heat-stable coated substrate according to claim 3, wherein the metal material comprises a noble metal.

5. The heat-stable coated substrate according to claim 4, wherein said noble metal is Pt or Pd.

6. The heat-stable coated substrate according to claim 3, wherein the metal oxide is maganese oxide, copper oxide, iron oxide, nickel oxide, chrome oxide, and the like.

7. The heat-stable coated substrate according to claim 6, wherein said metal oxide is manganese dioxide or nickel oxide.

8. The heat-stable coated substrate according to claim 3, wherein the metal material comprises ferrite.

9. The heat-stable coated substrate according to claim 3, wherein the metal material is mixed with a powder of an aluminium compound.

10. The heat-stable coated substrate according to claim 9, wherein said aluminum compound is selected from the group consisting of alumina, cordierite and mullite.

11. The heat-stable coated substrate according to claim 9, wherein said metal material contained within said powder is in the range of about 0.1 to 1.0 weight %.

12. The heat-stable coated substrate according to claim 9, wherein the diameter of the particles of said powder is in the order of about 40 to 300$\mu$.

13. The heat-stable coated substrate according to claims 9, wherein the powder containing the metal material as the oxidation catalyst is blended within a composition including the silicone synthetic resin and the organic solvent in the range of about 5 to 100 weight %.

14. The heat-stable coated substrate according to claims 9, wherein the powder containing the metal material as the oxidation catalyst is blended within a composition including the silicone synthetic resin and the organic solvent in the range of about several tens weight %.

15. The heat-stable coated substrate according to claim 6, wherein the metal oxide is blended within a composition containing the silicone synthetic resin and the organic solvent in the range of about 50 weight %.

16. The heat-stable coated substrate according to claim 6, wherein the metal oxide includes two types of metal oxide.

17. The heat-stable coated substrate according to claim 3, wherein the thickness of said coating is about 40 to 300$\mu$.

18. The heat-stable coated substrate according to claim 3, wherein said coating is exposed to an elevated temperature of about 300° to 400° Centigrade for about 5 to 10 minutes so that the silicone synthetic resin is carbonized to form a film of $SiO_2$.

19. A heat-stable coated substrate which catalytically oxidizes and removes fats and oils deposited on said coated substrate, comprising:
(a) a heat-stable substrate; and
(b) a porous $SiO_2$ film disposed on said substrate, said film having exposed particles of an oxidation catalyst, said porous $SiO_2$ film being a carbonized film of a mixture of: at least one silicone synthetic resin binder selected from the group consisting of straight silicone resins, silicone resins copolymerized with alkyds, silicone resins copolymerized with epoxy and silicone resins copolymerized acrylics; an organic solvent; and a thermostable oxidation catalyst which is thermostable up to 600° C. selected from the group consisting of metal material and metal oxide mixed within said silicone synthetic resin and said organic solvent.

20. A heat-stable coated substrate which catalytically oxidizes and removes fats and oils deposited thereon comprising:
a heat-stable substrate;
a carbonized coating disposed on at least one surface of said substrate, said coating being formed from at least one silicone synthetic resin binder selected from the group consisting of straight silicone resins, silicone resins copolymerized with alkyds, silicone resins copolymerized with epoxy, and silicone resins copolymerized with acrylics;
a solvent; and
0.1 to 30% by weight of a thermostable oxidation catalyst mingled within a composition of said silicone synthetic resin and said solvent.

21. A heat-stable coated substrate which catalytically oxidizes and removes fats and oils deposited thereon comprising:
a heat-stable substrate;
a carbonized coating disposed on at least one surface of said substrate, and coating being formed from a coating composition comprising a silicone synthetic resin selected from the group consisting of straight silicone synthetic resin, silicone intermediate products, modified silicone synthetic resin and mixtures thereof;
0.1 to 30% by weight of a heat-stable oxidation catalyst; and
a solvent.

22. A heat-stable coated substrate which catalytically oxidizes and removes fats and oils deposited thereon comprising:
a heat-stable substrate;
a self-cleaning coated film disposed on at least one surface of said substrate, said self-cleaning coated film being formed from a coating composition comprising about 30 to 80% by weight of a silicone synthetic resin selected from the group consisting of straight silicone synthetic resin, silicone intermediate products, modified silicone synthetic resin and mixtures thereof;
about 0.1 to 30% by weight of a thermostable oxidation catalyst having an average particle diameter between about 10 and 200$\mu$;
up to about 70% by weight of carrier particles for said oxidation catalyst having a diameter of about 40 to 300$\mu$; and
an organic solvent.

* * * * *